United States Patent
Meinecke et al.

(10) Patent No.: US 9,647,512 B2
(45) Date of Patent: May 9, 2017

(54) ELECTRIC MACHINE

(71) Applicant: ALSTOM Technology Ltd, Baden (CH)

(72) Inventors: Carsten Meinecke, Karlsruhe (DE); Christian Gaede, Wachenheim (DE); Habib Taghizadegan, Bensheim (DE)

(73) Assignee: General Electric Technology GmbH, Baden (CH)

( * ) Notice: Subject to any disclaimer, the term of this patent is extended or adjusted under 35 U.S.C. 154(b) by 220 days.

(21) Appl. No.: 14/600,464

(22) Filed: Jan. 20, 2015

(65) Prior Publication Data

US 2015/0130304 A1    May 14, 2015

Related U.S. Application Data

(63) Continuation of application No. PCT/EP2013/065006, filed on Jul. 16, 2013.

(30) Foreign Application Priority Data

Jul. 23, 2012   (EP) .................................. 12177409

(51) Int. Cl.
| | |
|---|---|
| *H02K 9/26* | (2006.01) |
| *H02K 9/24* | (2006.01) |
| *H02K 9/12* | (2006.01) |
| *H02K 11/20* | (2016.01) |
| *F16K 31/22* | (2006.01) |
| *B01D 53/26* | (2006.01) |

(52) U.S. Cl.
CPC ............. *H02K 9/26* (2013.01); *H02K 9/12* (2013.01); *H02K 9/24* (2013.01); *H02K 11/20* (2016.01); *B01D 53/26* (2013.01); *F16K 31/22* (2013.01); *Y10T 137/3068* (2015.04)

(58) Field of Classification Search
CPC ...... H02K 9/24; H02K 9/18; Y10T 137/3068; Y10T 137/7439; F16T 1/20; F16T 1/24; F16K 31/22; F16K 31/18
USPC .......................... 310/52, 55–56; 62/505, 509
See application file for complete search history.

(56) References Cited

U.S. PATENT DOCUMENTS

| | | | | |
|---|---|---|---|---|
| 2,675,493 A | * | 4/1954 | Grobel | G01M 3/228 |
| | | | | 165/284 |
| 2,826,044 A | * | 3/1958 | Reer | F25B 49/005 |
| | | | | 340/623 |
| 2,934,655 A | * | 4/1960 | Heller | F01K 27/02 |
| | | | | 290/2 |

(Continued)

FOREIGN PATENT DOCUMENTS

| | | | |
|---|---|---|---|
| GB | 2 033 092 A | 5/1980 | |
| JP | 01295641 A | * 11/1989 | ............... H02K 9/24 |
| JP | 7123647 A | 5/1995 | |

OTHER PUBLICATIONS

English machine translation of Kawada, JP 7-123647, May 1995.*

*Primary Examiner* — Burton Mullins

(74) *Attorney, Agent, or Firm* — GE Global Patent Operation; Rita D. Vacca

(57) ABSTRACT

The electric machine has a casing housing a stator and a rotor and containing a gas, and a dryer for the gas. The dryer is connected to the casing. The dryer includes a separation group, for separating humidity from the gas, a water accumulator, for at least temporally accumulating water discharged from the separation group, at least a detector for the water contained in the water accumulator.

14 Claims, 2 Drawing Sheets

(56) References Cited

U.S. PATENT DOCUMENTS

| | | | | |
|---|---|---|---|---|
| 3,093,976 A * | 6/1963 | Walcutt | ............... | F24F 5/001 62/196.4 |
| 3,122,668 A * | 2/1964 | Cuny | ............... | G01M 3/3236 310/53 |
| 3,755,702 A * | 8/1973 | Willyoung | ............ | H02K 9/005 310/53 |
| 4,290,390 A * | 9/1981 | Juzi | ............... | F01K 3/22 122/122 |
| 4,602,680 A * | 7/1986 | Bradford | ............ | F24F 5/0007 165/104.19 |
| 4,766,557 A * | 8/1988 | Twerdochlib | ............ | H02K 9/24 310/52 |
| 6,326,709 B1 * | 12/2001 | Adelmann | ............ | H02K 9/193 310/52 |
| 2007/0215208 A1 * | 9/2007 | Joo | ............... | F16T 1/24 137/185 |

* cited by examiner

ELECTRIC MACHINE

CROSS-REFERENCE TO RELATED APPLICATIONS

This application claims priority to PCT/EP2013/065006 filed Jul. 16, 2013, which claims priority to European application 12177409.5 filed Jul. 23, 2012, both of which are hereby incorporated in their entireties.

TECHNICAL FIELD

The present disclosure relates to an electric machine.

The electric machine is in particular a rotating electric machine such as a synchronous generator to be connected to a gas or steam turbine (turbo-generator) or a synchronous generator to be connected to a hydro turbine (hydro generator) or an asynchronous generator or a synchronous or asynchronous electric motor or also other types of electric machines.

BACKGROUND

Electric machines have a casing that houses a stator and a rotor. The casing contains a gas (for example hydrogen) that is used as a cooling gas for the stator and rotor.

The gas can contain humidity that must be removed, because it can cause corrosion and electric flashover.

In order to remove humidity from the gas, dryers are provided; dryers are usually outside of the casing and are connected to the casing via pipes.

A type of dryer often used is the so called condensation dryer.

Condensation dryers have a heat exchanger; warm and potentially humid gas coming from the electric machine enters the heat exchanger at one side thereof and cooled gas exits at the other side thereof.

During operation the heat exchanger cools the gas causing humidity condensation; water drops separate from the gas and are collected inside the heat exchanger. In addition, a drop separator may be connected downstream of the heat exchanger in order to collect remaining drops.

A float valve is located below the heat exchanger (or drop separator); the float valve is connected to the heat exchanger (or drop separator) via a water line and a venting line. Water thus moves down into the float valve via the water line and, at the same time, gas moves up from the float valve into the heat exchanger (or drop separator) via the venting line (otherwise water could not properly enter the float valve).

From the float valve water is discharged.

In case of troubles at the float valve, such that the float valve remains open and does not close anymore, the gas could be inadvertently discharged from the casing via the heat exchanger, drop separation, water and gas line and float valve.

This must be avoided, because the gas pressure inside the electric machine would drop, reducing the cooling capabilities of the gas and eventually cause a trip of the electric machine, e.g. via a pressure or temperature supervision device.

SUMMARY

An aspect of the disclosure includes providing an electric machine that is reliable, because gas escape from the casing via the dryer can be quickly detected.

These and further aspects are attained by providing an electric machine in accordance with the accompanying claims.

BRIEF DESCRIPTION OF THE DRAWINGS

Further characteristics and advantages will be more apparent from the description of a preferred but non-exclusive embodiment of the electric machine, illustrated by way of non-limiting example in the accompanying drawings, in which.

DETAILED DESCRIPTION

Figure 1:
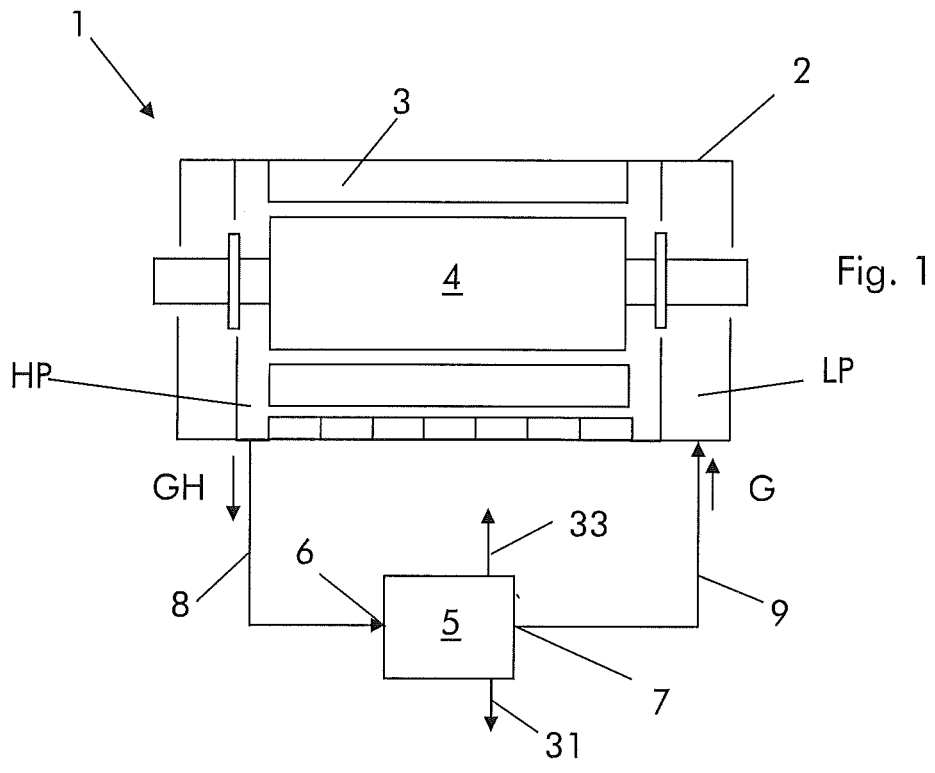
FIG. 1 is a schematic view of an electric machine.

With reference to the figures, the electric machine 1 has a casing 2 that houses a stator 3 and a rotor 4. The casing 2 contains a gas such as hydrogen that is used as a cooling gas for the stator and rotor; usually the hydrogen in the casing has a pressure between 2-6 bar.

The electric machine 1 also has a dryer 5 for the gas; the dryer is outside of the casing 2 and has an inlet 6 and an outlet 7 for the gas connected to the casing 2 via an input line 8 and an output line 9.

The dryer 5 includes a separation group 12, for separating humidity from the gas, and a water accumulator 13, for at least temporally accumulating water discharged from the separation group 12.

In addition, a detector 14 for the water contained in the accumulator 13 is provided.

Preferably the water accumulator 13 includes a siphon; naturally also other kinds of water accumulators are possible.

The water accumulator 13 such as the siphon allows an easy and reliable detection of water; without water accumulator 13, detection is difficult, as the water flow is not expected to be continuous.

In addition, a closing valve 16 downstream of the water accumulator 13 is preferably provided.

For safety reasons, a gas trap 17 is provided downstream of the water accumulator 13. As shown, the gas trap 17 is also downstream of the closing valve 16.

Different kinds of detectors 14 are possible, such as optic, acoustic, mechanical or electric detectors; other kinds of detectors are anyhow possible according to the needs.

The separation group 12 includes a heat exchanger 20 and, if needed, also a water separator 21 that is provided downstream of the heat exchanger 20.

In addition, downstream of the heat exchanger 20 (and also downstream of the drop separator 21, if provided), the separation group 12 includes a float valve 23 and a water line 25 and venting line 26 connected to the float valve 23.

Figure 2:
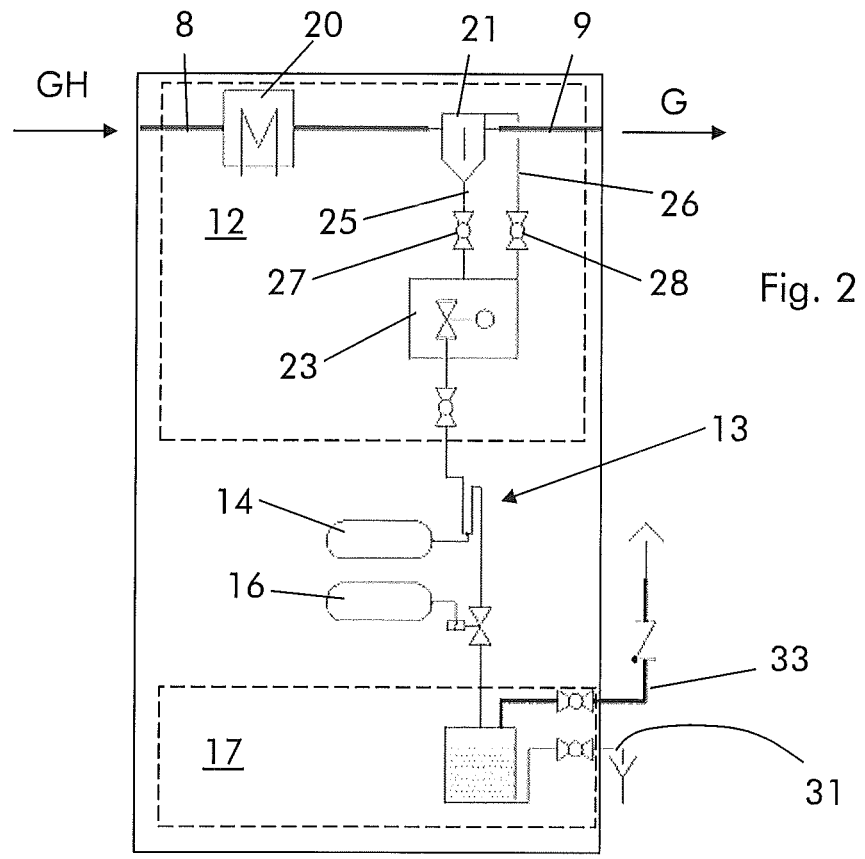
FIGS. 2 and 3 show different embodiments of dryers.
Figure 3:
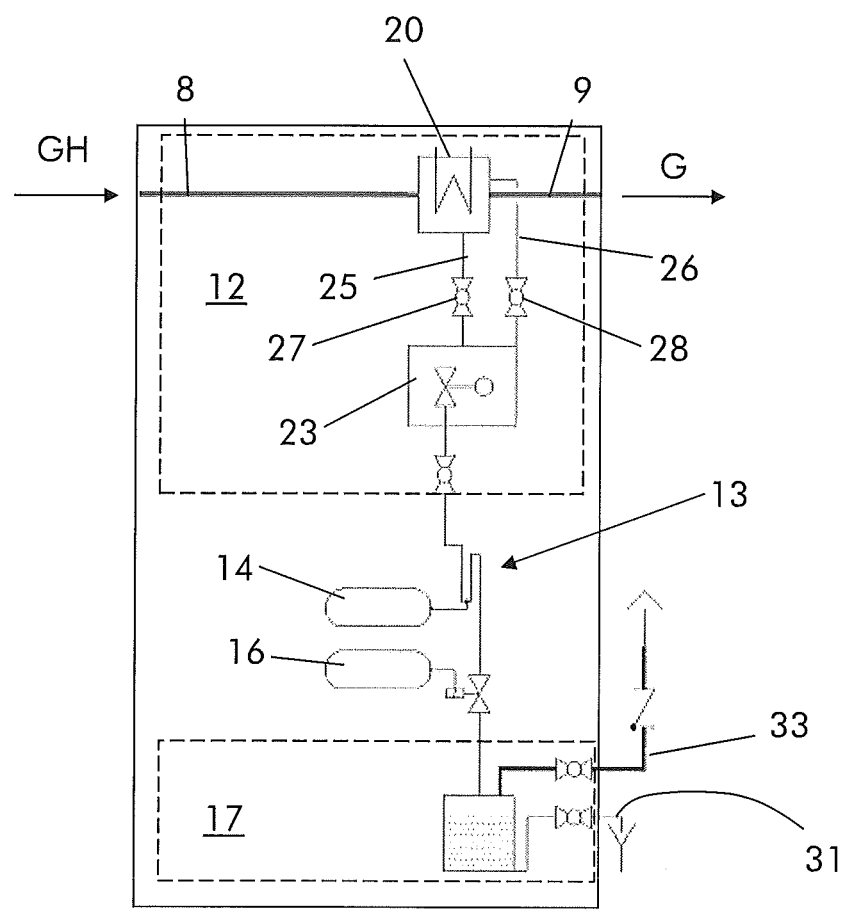

The water line 25 and venting line 26 are shown connected to the drop separator 21 (FIG. 2), it is clear that if the drop separator 21 is not provided, the water line 25 and venting line 26 are connected to the heat exchanger 20 (FIG. 3).

The water line 25 has a closing valve 27 and the venting line 26 has a closing valve 28. The valves 27, 28 are usually manual valves provided for maintenance purpose.

The operation of the electric machine is apparent from that described and illustrated and, with particular reference to the embodiment of FIG. 2, it is substantially the following. The operation of the electric machine in the embodiment of FIG. 3 is similar to the operation of the machine in the embodiment of FIG. 2.

During operation a high pressure zone HP and a low pressure zone LP are defined in the casing 2.

The input line 8 is connected to the high pressure zone HP and the output line 9 is connected to the low pressure zone LP of the casing 2, such that the differential pressure causes gas circulation through the lines 8, 9 and thus through the dryer 5; it is anyhow clear that apparatuses can be provided to help or improve circulation, such as fans, pumps, compressors, etc.

The gas containing humidity GH enters the heat exchanger and is cooled to a low temperature (such as for example −10° C.) to condensate the humidity; usually the gas is then heated again to the operating temperature of the gas inside the casing 2 (for example 30-40° C.), this can be done recovering the heat removed from the gas during cooling.

The gas and water are then supplied to the drop separator 21, where liquid water drops are separated from the gas. Thus the gas without humidity G moves out of the dryer 5 and is conveyed back to the casing 2 via the output line 9.

The water passes from the drop separator 21 to the float valve 23 via the water line 25; at the same time gas passes from the float valve 23 into the drop separator 21 via the venting line 26 (otherwise water could not enter the float valve 23).

In case the float valve 23 operates correctly, it opens to have water exceeding a prefixed level to move out of it towards the siphon 13.

The water coming from the float valve 23 accumulates at the bottom of the siphon, while displacing water already contained in it and moving it toward the gas trap 17. This water at the bottom of the siphon 13 can be easily detected by the detector 14.

From the gas trap 17 water is discharged via a water discharge line 31 and gas that could eventually reach the gas trap 17 is discharged via a gas discharge line 33, typically an exhaust line that releases the gas over the roof top of the building, where the electric machine is located, into atmosphere.

In case of non-correct operation, when for example the float valve 23 remains in the open position and cannot close anymore, gas passes through the water line 25 and/or venting line 26 and, passing through the float valve 23, reaches the siphon 13.

At the siphon this gas displaces all water accumulated at its bottom and moves toward the gas trap 17, to be then discharged via the gas discharge line 33.

In this case the detector can easily detect that no water is accumulated in the siphon anymore, indicating that the float valve 23 does not operate anymore.

Even if only siphon was indicated as a water accumulator, it is clear that any kind of water accumulator can be used, provided that it can allow water accumulation and, in addition, water displacement due to the gas coming from the float valve 23.

The present disclosure also refers to a method for retrofitting an electric machine 1; the electric machine 1 has a casing 2, which houses a stator 3 and a rotor 4 and contains a gas, and a dryer for the gas. The dryer is connected to the casing 2.

The method includes removing the dryer, providing a new dryer 5, and connecting the new dryer 5 to the casing.

The new dryer 5 includes:
a separation group 12, for separating humidity from the gas,
a water accumulator 13, for at least temporally accumulating water discharged from the separation group 12,
at least a detector 14 for the water contained in the water accumulator 13.

Preferably the water accumulator 13 includes a siphon.

Naturally the features described may be independently provided from one another.

In practice the materials used and the dimensions can be chosen at will according to requirements and to the state of the art.

The invention claimed is:

1. An electric machine comprising:
a casing housing a stator, a rotor, and a gas; and
a dryer connected to the casing and operable for drying the gas, the dryer including
a separation group operable for separating humidity from the gas including a heat exchanger and a float valve downstream of the heat exchanger,
a water accumulator operable for at least temporally accumulating water discharged from the separation group, and
at least a detector operable for detecting the water accumulated in the water accumulator.

2. The electric machine according to claim 1, wherein the water accumulator includes a siphon.

3. The electric machine according to claim 1, further comprising a closing valve downstream of the water accumulator.

4. The electric machine according to claim 1, further comprising a gas trap downstream of the water accumulator.

5. The electric machine according to claim 1, wherein the detector includes an optic, acoustic, mechanical or electric detector.

6. The electric machine according to claim 3, further comprising a gas trap downstream of the closing valve.

7. The electric machine according to claim 1, wherein a pressure differential in the casing circulates the gas through the dryer.

8. The electric machine according to claim 1, wherein downstream of the heat exchanger, the separation group includes a water separator.

9. The electric machine according to claim 1, wherein an input line of the dryer is connected to a high pressure zone within the casing and an output line of the dryer is connected to a low pressure zone within the casing.

10. The electric machine according to claim 1, wherein the separation group includes a water line and a venting line connected to the float valve.

11. A dryer for an electric machine comprising:
a separation group operable for separating humidity from a gas including a heat exchanger and a float valve downstream of the heat exchanger;
a water accumulator operable for at least temporally accumulating water discharged from the separation group; and
at least a detector operable for detecting the water accumulated in the water accumulator.

12. The dryer according to claim 11, wherein the water accumulator includes a siphon.

13. A method for retrofitting an electric machine comprising:
providing the electric machine including a casing housing, a stator, a rotor, and
a dryer connected to the casing;
disconnecting the dryer from the casing;
connecting a new dryer to the casing, wherein the new dryer includes:

a separation group operable for separating humidity from a gas including a heat exchanger and a float valve downstream of the heat exchanger,
a water accumulator operable for at least temporally accumulating water discharged from the separation group, and
at least a detector operable for detecting the water accumulated in the water accumulator.

14. The method according to claim 13, wherein the water accumulator includes a siphon.

* * * * *